3,409,426
N,N'- (SUBSTITUTED BENZYLIDENE) ALKYLENE DIAMINES AND THEIR USE IN THE CONTROL OF PLANT GROWTH
Pasquale Paul Minieri, Woodside, N.Y., and Joseph F. De Gaetano, Montvale, N.J., assignors to Tenneco Chemicals, Inc., a corporation of Delaware
No Drawing. Filed Nov. 12, 1964, Ser. No. 410,734
4 Claims. (Cl. 71—121)

ABSTRACT OF THE DISCLOSURE

N,N'-(substituted benzylidene) alkylene diamines having the structural formula

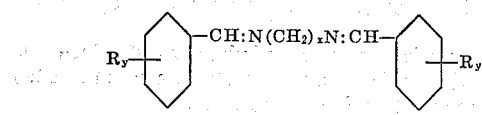

wherein each R represents chloro, nitro, amino, lower alkyl, or lower alkoxy groups, or mixtures thereof; $x$ represents an integer in the range of 1 to 6; and each $y$ represents an integer in the range of 2 to 5, are effective pre-emergence and postemergence selective herbicides. Among the most active of these compounds are N,N'-bis-(2,3,6-trichlorobenzylidene)-ethylene diamine and N,N'-bis-(2,6-dichloro-3-nitrobenzylidene)-ethylene diamine.

---

This invention relates to novel N,N'-(substituted benzylidene) alkylene diamines. It further relates to the use of these compounds in the control or inhibition of plant growth.

In accordance with this invention, it has been discovered that certain N,N'-(substituted benzylidene) alkylene diamines have unusual and valuable activity as selective herbicides. These compounds have the structure

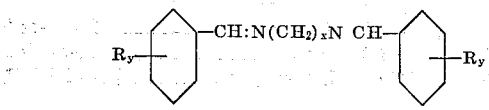

wherein each R represents chloro, nitro, amino, lower alkyl, or lower alkoxy groups or mixtures thereof, $x$ represents an integer in the range of 1 to 6, and each $y$ represents an integer in the range of 2 to 5. The nature of the substituents and the number of each on the two aromatic rings may be the same or different. If is generally preferred that each ring have a chlorine atom in at least one of its ortho positions. Particularly preferred compounds for use as selective-herbicides are those that have chlorine atoms in the 2-, 3-, and 6- positions of the aromatic rings. Illustrative of these compounds are the following: N,N'-bis (2,6-dichlorobenzylidene) ethylene diamine, N,N'-bis (2,3,6-trichlorobenzylidene) ethylene diamine, N,N'-bis (2,3-dichloro-6-methylbenzylidene) ethylene diamine, N,N'-bis (2,3-dichloro-6-methoxybenzylidene) ethylene diamine, N, N'-bis (2,3-trichloro-5-nitrobenzylidene) ethylene diamine, N,N'-bis (2,3,6-trichloro-5-aminobenzylidene)ethylene diamine, N-2,3,6-trichlorobenzylidene-N'-2, 6-dichlorobenzylidene ethylene diamine, N-2,3,6-trichlorobenzylidene-N'-2,3-dichloro-6-methylbenzylidene ethylene diamine, N,N'-bis (2,3,5,6-tetrachlorobenzylidene) ethylene diamine, N,N'-bis (2,3,4,5,6-pentachlorobenzylidene) ethylene diamine, N,N'-bis (2,6-dichlorobenzylidene) tetramethylene diamine, N,N'-bis (2,3,6-trichlorobenzylidene) tetramethylene diamine, N,N'-bis (2,3,6-trichlorobenzylidene) pentamethylene diamine, N,N'-bis (2,3,6-trichlorobenzylidene) hexamethylene diamine, N-2,3,6-trichlorobenzylidene-N'-2,6-dichlorobenzylidene hexamethylene diamine, and the like.

The novel compounds of this invention may be prepared by any convenient procedure. For example, they may be prepared by the reaction of the appropriate substituted benzaldehyde with an alkylene diamine.

The subsbtituted benzylidene alkylene diamines may be applied to a wide variety of plants to control or inhibit their growth. They are of particular value in the control of weeds in an area containing a crop.

While the compounds of this invention may be applied as such to plants or to the soil, they are preferably used in combination with an inert carrier. These compounds may be mixed with or deposited upon an inert finely-divided solid and employed as dusts. Such mixtures may also be dispersed in water with or without the aid of a wetting agent and the resulting aqueous suspensions employed as sprays. Alternatively, these compounds may be used as the active herbicidal constituents in hydrocarbon solutions, in oil-in-water emulsions, or in aqueous dispersions.

The concentration of the substituted benzylidene alkylene diamine in the herbicidal composition may vary within wide limits and depends upon a number of factors, the most important of which are the amount of the composition to be applied per unit of area and the type or types of plants being treated. In most cases the composition contains approximately 0.1 percent to 85 percent by weight of the herbicidal compound. The amount of the composition used is that which will provide the desired phytotoxic effect. Generally it is used at a rate that will apply approximately 0.5 pound to 30 pounds and preferably 2 pounds to 10 pounds of the herbicidal compound per acre. Mixtures of two or more of the herbicidal compounds of this invention may be used. If desired, other herbicidal compounds may also be present in the herbicidal compositions.

This invention is illustrated by the examples that follow. It is to be understod, however, that these examples are given solely for the purpose of illustration and that the invention is not limited to any of the specific materials or conditions mentioned therein except as set forth in the accompanying claims.

Example I

A mixture of 42 grams (0.2 mole) of 2,3,6-trichlorobenzaldehyde, 6.1 grams 0.1 mole) of ethylene diamine, and 200 ml. of ethanol was heated at its reflux temperature for 15 minutes and then cooled to room temperature. The product was collected on a filter, washed with cold ethanol, and dried. There was obtained an 83.5% yield of N,N'-bis (2,3,6-trichlorobenzylidene) ethylene diamine that melted at 169°–170.5° C. It contained 48.8% Cl and 6.4% N (calculated for $C_{16}H_{10}Cl_6N_2$: 48.2% Cl and 6.3% N).

Example II

A mixture of 33 grams (0.15 mole) of 2,6-dichloro-3-nitrobenzaldehyde, 4.6 grams (0.075 mole) of ethylene diamine, and 150 ml. of ethanol was heated at its reflux temperature for 15 minutes and then cooled to room temperature. The product was collected on a filter, washed with cold ethanol and dried. There was obtained a 95% yield of N,N'-bis (2,6-dichloro-3-nitrobenzylidene) ethylene diamine that melted at 178°–179° C. It contained 30.2% Cl (calculated for $C_{16}H_{10}Cl_4N_4O_4$, 30.6% Cl).

Example III

Groups of greenhouse flats containing soil were planted with seeds of various crop and weed species. In the pre-emergence tests, the flats were sprayed with a 0.3% solution in benzene of the product of Example I. In the post-emergence tests, the plants were prayed with the same herbicidal solution 2 to 4 weeks after planting. The solution was applied to the soil or to the plants at rates ranging from 2.5 pounds to 10 pounds of the herbicidal compound per acre. In each case the results were observed 2 weeks after the application of the herbicidal composition.

In Tables I and II the effectiveness of the herbicidal compound, as determined by comparison with untreated plantings, is indicated by the numbers "0" through "10" in increasing order of effectiveness. Thus "0" indicates no herbicidal activity: "1"–"3," slight injury; "4"–"6," moderate injury; "7"–"9," severe injury; and "10," destruction of all plants.

The results of these tests are given in Table I.

TABLE I.—HERBICIDAL ACTIVITY OF N,N'-BIS(2,3,6-TRICHLOROBENZYLIDENE) ETHYLENE DIAMINE IN BENZENE SOLUTION

| Rate of Application (lbs./acre) | Preemergence | | | Postemergence | | |
|---|---|---|---|---|---|---|
| | 2.5 | 5 | 10 | 2.5 | 5 | 10 |
| Plant Species: | | | | | | |
| Corn | 3 | 5 | 7 | 3 | 5 | 8 |
| Wheat | 3 | 8 | 8 | 2 | 4 | 5 |
| Oats | 5 | 9 | 9 | 4 | 7 | 8 |
| Soybeans | 9 | 10 | 9 | 9 | 10 | 10 |
| Clover | 8 | 8 | 9 | 9 | 10 | 10 |
| Onions | 5 | 9 | 9 | 4 | 5 | 8 |
| Foxtail | 9 | 9 | 9 | 2 | 8 | 10 |
| Ryegrass | 0 | 6 | 8 | 2 | 4 | 7 |
| Crabgrass | 8 | 7 | 9 | 4 | 4 | 6 |
| Mustard | 10 | 10 | 10 | 10 | 10 | 10 |
| Buckwheat | 3 | 5 | 8 | 7 | 9 | 10 |
| Morning Glory | 7 | 9 | 10 | 7 | 10 | 10 |

Example IV

Group of greenhouse flats containing soil were planted with seeds of various crop and weed species. The flats were then sprayed with a 0.3% suspension in water of the product of Example I at rates ranging from 2.5 pounds to 20 pounds per acre. In each case the results were observed 2 weeks after the application of the herbicidal composition. The results of these tests are given in Table II.

TABLE II.—HERBICIDAL ACTIVITY OF N,N'-BIS(2,3,6-TRICHLOROBENZYLIDENE) ETHLENE DIAMINE IN AQUEOUS SUSPENSION

| Plant Species | Rate of Application (lbs./acre) | | | |
|---|---|---|---|---|
| | 2.5 | 5 | 10 | 20 |
| Corn | 7 | 8 | 8 | 9 |
| Wheat | 6 | 6 | 8 | 8 |
| Oats | 8 | 8 | 8 | 9 |
| Soybeans | 9 | 8 | 10 | 10 |
| Clover | 9 | 10 | 10 | 10 |
| Onions | 8 | 8 | 9 | 10 |
| Foxtail | 10 | 10 | 10 | 10 |
| Ryegrass | 8 | 8 | 9 | 10 |
| Crapgrass | 10 | 10 | 10 | 10 |
| Mustard | 10 | 10 | 10 | 10 |
| Buckwheat | 8 | 8 | 8 | 8 |
| Morning Glory | 10 | 10 | 10 | 10 |

What is claimed is:

1. A process for the control of plant growth in a locus which comprises applying to the locus a phytotoxic amount of a herbicidal compound having the structure

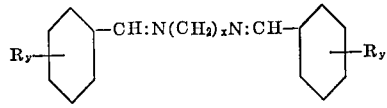

wherein each R represents a member selected from the group consisting of chloro, nitro, amino, lower alkyl, lower alkoxy, and mixtures thereof, x represents an integer in the range of 1 to 6, and each y represents an integer in the range of 2 to 5.

2. The process of claim 1 wherein the herbicidal compound is N,N'-bis (2,3,6-trichlorobenzylidene) ethylene diamine.

3. A process for the control of plant growth which comprises applying to the plants a phytotoxic amount of a herbicidal compound having the structure

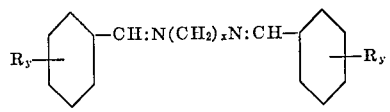

wherein each R represents a member selected from the group consisting of chloro, nitro, amino, lower alkyl, lower alkoxy, and mixtures thereof, x represents an integer in the range of 1 to 6, and each y represents an integer in the range of 2 to 5.

4. A process for the control of plant growth which comprises applying to the plants a phytotoxic amount of N,N'-bis (2,3,6-trichlorobenzylidene) ethylene diamine.

References Cited

UNITED STATES PATENTS

| 2,914,560 | 11/1959 | Robertson | 260—566 |
| 2,951,832 | 9/1960 | Moran | 260—566 |
| 3,253,022 | 5/1966 | Linder et al. | 71—2.3 XR |

LEWIS GOTTS, *Primary Examiner.*

G. HOLIRAH, *Assistant Examiner.*